United States Patent Office 2,931,683
Patented Apr. 5, 1960

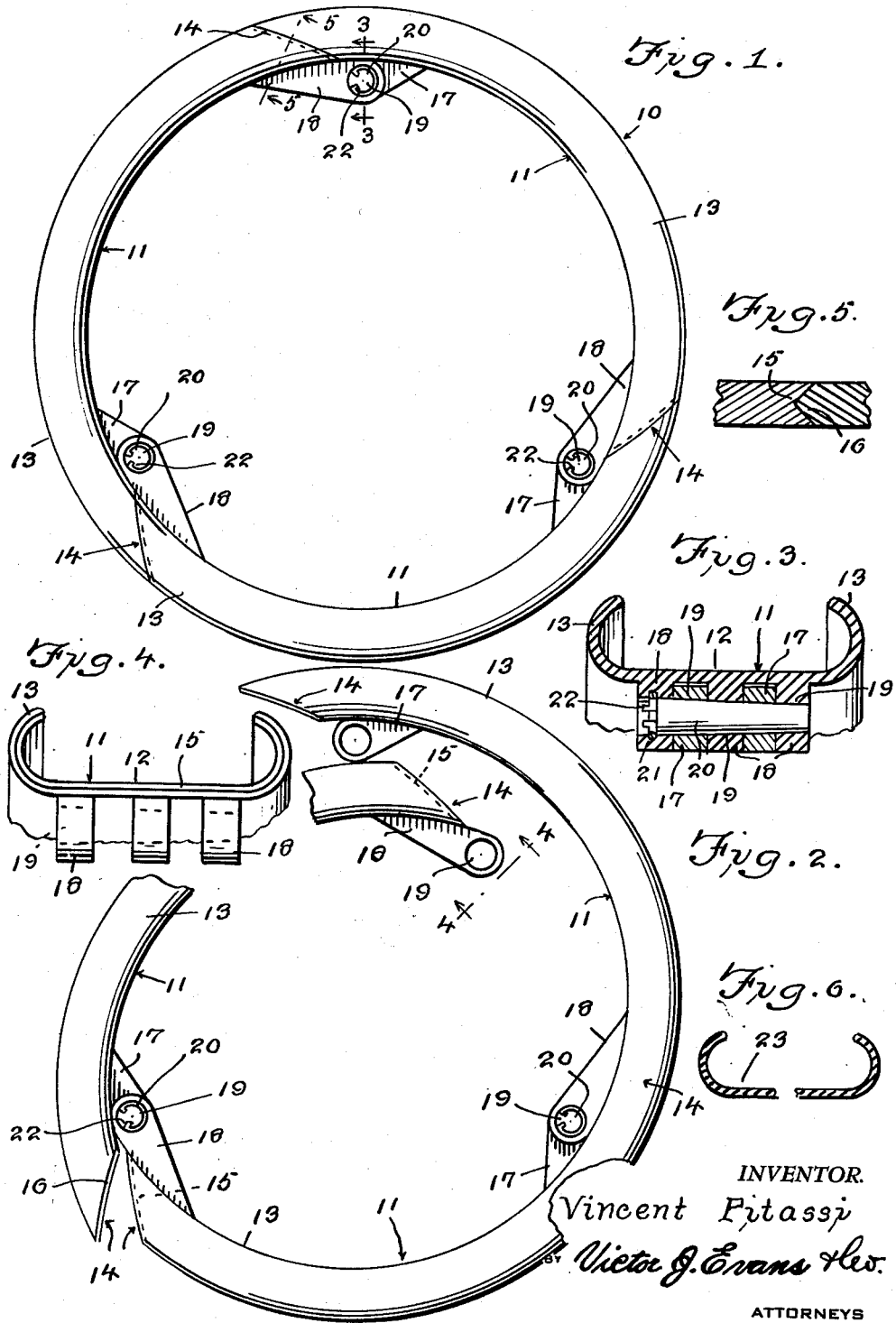

2,931,683

TIRE RIM

Vincent Pitassi, Oakdale, Calif.

Application May 6, 1958, Serial No. 733,296

3 Claims. (Cl. 301—35)

This invention relates to a tire rim.

The object of the invention is to provide a tire rim that includes a plurality of sections that are detachably connected together.

Another object of the invention is to provide a tire rim which includes a plurality of similar segments or sections, so that when a tire is to be changed, the rim can be readily disassembled so as to facilitate removal or replacement of the tire.

A further object of the invention is to provide a tire rim which is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view illustrating the tire rim of the present invention, and showing the rim in assembled position.

Figure 2 is a view similar to Figure 1, but showing one of the sections disconnected or disassembled, and with parts broken away.

Figure 3 is a sectional view taken on the line 3—3 of Figure 1.

Figure 4 is a sectional view taken on the line 4—4 of Figure 2.

Figure 5 is a sectional view taken on the line 5—5 of Figure 1.

Figure 6 is a sectional view illustrating a modification.

Referring in detail to the drawings, the numeral 10 indicates the tire rim of the present invention, and the tire rim 10 includes a plurality of similar sections or segments which are each indicated by the numeral 11. As shown in the drawings, each of the sections 11 have the same shape and size so that these sections are interchangeable with each other. Each section 11 includes a base portion 12 which is arcuate in formation, and formed integral with each base section or portion 12 or secured thereto are opposed curved flanges 13, Figure 3.

As shown in the drawings, the ends of each section 11 are inclined as at 14, and the inclination 14 is at an angle of approximately 45 degrees. One end of each section 11 is provided with a groove 15, while the other end of each section is shaped to define a tongue 16, and when the sections are assembled to form a completed ring, the tongues and grooves interfit or interengage so as to provide a snug fit between the parts.

Extending from the inner portion of each of the sections 11 and secured thereto or formed integral therewith are lugs 17 and 18. Thus, it will be seen that there is arranged adjacent one end of each section a plurality of spaced parallel lugs 17, while the lugs 18 which are also arranged in spaced parallel relation with respect to each other, are arranged adjacent the other end of each section.

It is to be noted that when the sections are assembled to form the rim, the lugs 17 and 18 interfit or intermesh with each other, and these lugs are provided with registering apertures or openings 19. As shown in Figure 3, the openings 19 in a particular row are arranged so that their diameters vary in size progressively whereby a tapered pin 20 is adapted to be inserted through the registering openings 19. One of the lugs is provided with an annular groove 21 for the reception of a split ring or retaining clip 22, whereby the pin 20 will be held in place. The clip 22 is adapted to abut the end of the pin 20 which is of greatest diameter.

From the foregoing, it is apparent that there has been provided a tire rim which includes a plurality of sections which are of the same size and shape. When the sections 11 are in the assembled position as for example as shown in Figure 1, it will be seen that the tongue 16 of one section interfits with the groove 15 of the adjacent section, and each of the sections 11 includes the arcuate base portion 12 and the curved side flanges 13. Furthermore each section 11 includes a plurality of spaced parallel lugs 17 and the lugs 18, and when the sections are in assembled position, the lugs 17 of one section intermesh with the lugs 18 of the adjacent section and these lugs are provided with openings 19 that register with each other as for example as shown in Figure 3. These openings are of progressively different sizes whereby a tapered pin 20 can be extended through each row of registering openings 19. One of the outermost lugs 18 is provided with a groove 21 whereby a retaining clip 22 can be seated in the groove 21 for maintaining the pin 20 in the openings 19.

When a tire is to be removed or replaced or repaired or changed, it is only necessary to first remove the retaining clip 22 from the groove 21 whereby the pin 20 can be knocked or pushed out of the registering openings 19 so that the sections 11 are free to separate and this construction provides a means whereby mounting or removal of tires from the tire rim is facilitated.

An important advantage of the present invention is that the tire rim utilizes three identical and interchangeable rim sections or segments 11 and these sections can be dismounted or mounted quickly and easily by means of the tapered pins 20 and the interlocking hinge arrangement. Thus, in the event that one of the sections becomes damaged, a standard section or segment can be used so that it is not necessary to replace the entire rim. The present invention is especially suitable for heavy duty equipment, as for example for use on large earth moving equipment where the tires must carry loads from 40 tons and up. Rims which are presently in use on heavy duty equipment are heavy and unwieldy and are expensive to manufacture and are not convenient to use. Furthermore, special expensive pneumatic tools and equipment must be used during mounting and dismounting operations. With the present invention, only a hammer and drift pin are necessary to set the tapered pins 20 in place or to remove the tapered pins when the rim is being disassembled. Furthermore, rims now in use must be carefully machined and aligned whereas the component rim sections or segments 11 of the present invention may be cast with one mold according to size and this will result in a great savings in the manufacture of the parts. Furthermore, the herein disclosed rim is self-aligning and when the tapered pins are fully seated, the rim sections will be automatically moved into their proper aligned position and the sections will be held firmly and securely in place. The rim of the present invention can be used with a tube or tubeless tire, and when used with tubeless tires, a rubber gasket such as the gasket 23 of Figure 6 can be used in the rim.

Thus, it will be seen that according to the present invention there is provided interchangeable sections which can all be cast from one mold and this will result in considerable savings over fabrication methods used on other rim designs. Furthermore, the parts can be readily mounted and dismounted without the necessity of using expensive tools and equipment.

The rim can be used on different types of vehicles, and the parts can be made of any suitable material and in different shapes or sizes. Heavy duty construction equipment can utilize the rim and a tire mounted on the rim can be changed quickly and easily so that the cost of upkeep or repair of equipment is greatly reduced. Also, the rim can be used on private or commercial vehicles. The pins 20 may be made of hardened steel, and the clip 22 defines a keeper for holding the pin 20 in place. The openings 19 are properly tapered to receive the pin 20.

Minor changes in shape, size and rearrangement of details coming within the field of invention claimed may be resorted to in actual practice, if desired.

I claim:

1. In a tire rim, a plurality of sections each having the same shape and size, each of said sections including a base portion which is arcuate in formation, a pair of opposed curved flanges arranged along the sides of the base portion, the ends of the sections being inclined at an angle of approximately 45 degrees, there being a groove in an end of each section and a pointed tongue in the other end of each section, a plurality of spaced parallel lugs secured to the inner portions of the sections adjacent each end thereof, there being registering apertures in said lugs, the apertures being of progressively greater diameter in a particular row of apertures when the lugs interfit as when the sections are in assembled position, a removable tapered pin extending through each row of apertures, there being an annular groove in one of said lugs, and a removable retaining clip seated in said groove.

2. In a tire rim, a plurality of sections each having the same shape and size, each of said sections including a base portion which is arcuate in formation, a pair of opposed curved flanges arranged along the sides of the base portion, the ends of the sections being inclined at an angle of approximately 45 degrees, there being a groove in an end of each section and a pointed tongue in the other end of each section, a plurality of spaced parallel lugs secured to the inner portions of the sections adjacent each end thereof, there being registering apertures in said lugs, the apertures being of progressively greater diameter in a particular row of apertures when the lugs interfit as when the sections are in assembled position, a removable tapered pin extending through each row of apertures, there being an annular groove in one of said lugs, and a removable retaining clip seated in said groove, said clip abutting the end of the pin which is of greatest diameter.

3. In a tire rim, a plurality of sections each having the same shape and size, each of said sections including a base portion which is arcuate in formation, a pair of opposed curved flanges arranged along the sides of the base portion, the ends of the sections being inclined at an angle of approximately 45 degrees, there being a groove in an end of each section and a pointed tongue in the other end of each section, a plurality of spaced parallel lugs secured to the inner portions of the sections adjacent each end thereof, there being registering apertures in said lugs, the apertures being of progressively greater diameter in a particular row of apertures when the lugs interfit as when the sections are in assembled position, a removable tapered pin extending through each row of apertures, there being an annular groove in one of said lugs, and a removable retaining clip seated in said groove, said clip abutting the end of the pin which is of greatest diameter, whereby when the sections are assembled, a continuous circular rim is provided, and wherein when the rim is in assembled position, the lugs interfit, and the tongues and grooves are arranged in engagement with each other.

References Cited in the file of this patent

UNITED STATES PATENTS

| | | |
|---|---|---|
| 807,680 | Lewis | Dec. 19, 1905 |
| 1,437,105 | Howell | Nov. 28, 1922 |

FOREIGN PATENTS

| | | |
|---|---|---|
| 21,793 | Great Britain | 1899 |
| 255,595 | Switzerland | Feb. 1, 1949 |